K. R. DICKINSON.
HARROW.
APPLICATION FILED NOV. 26, 1915.
1,209,565.
Patented Dec. 19, 1916.
2 SHEETS—SHEET 1.
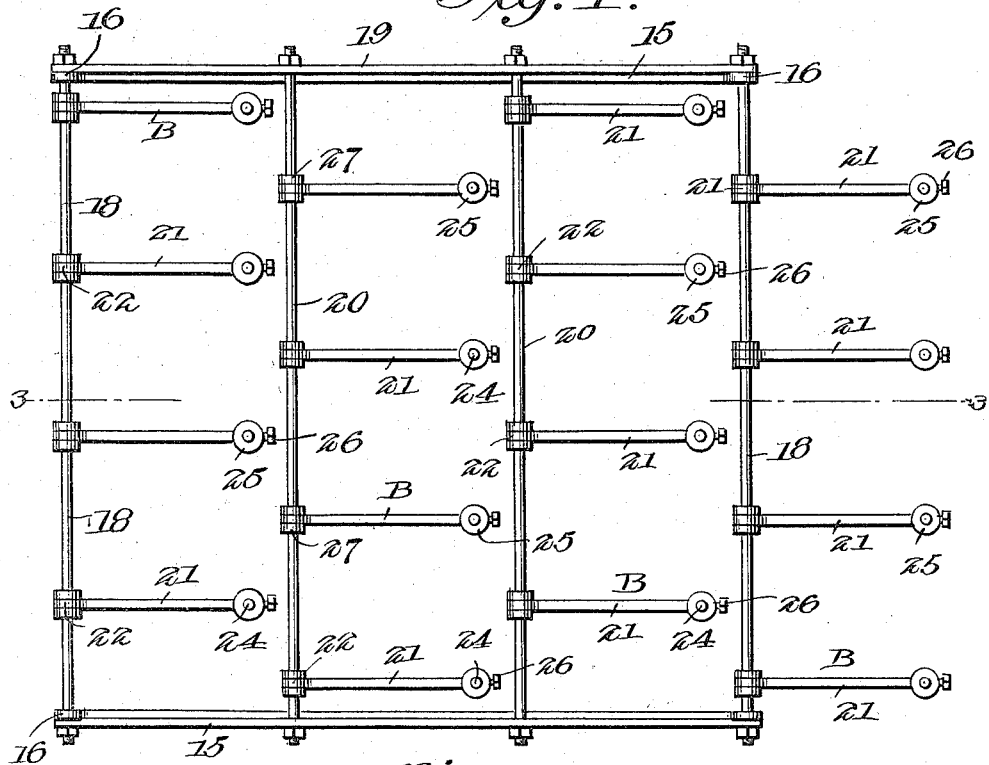
Fig. 1.
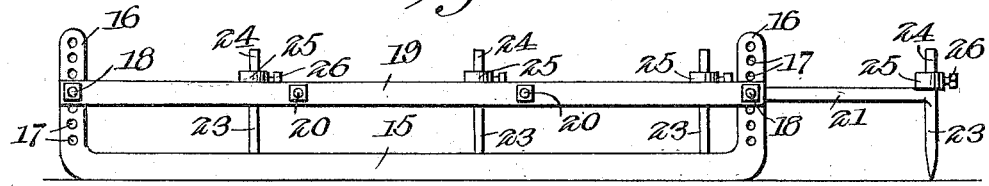
Fig. 2.
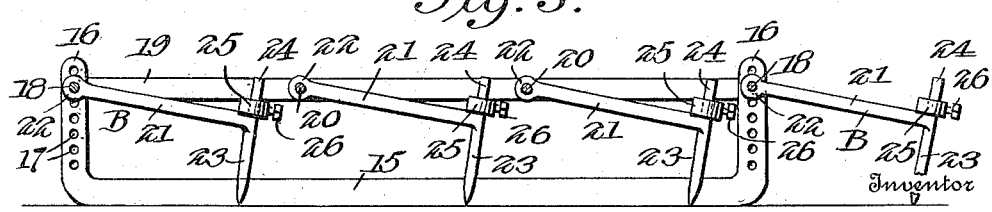
Fig. 3.
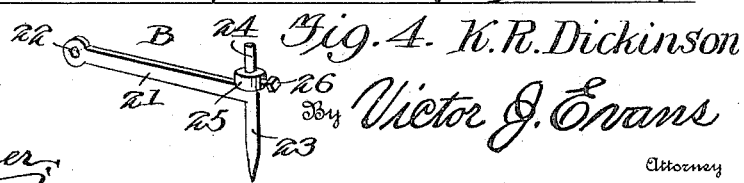
Fig. 4. K. R. Dickinson
By Victor J. Evans
Attorney
Witnesses
Hugh H. Ott
Wm. Bagger

UNITED STATES PATENT OFFICE.

KYLE R. DICKINSON, OF BALLINGER, TEXAS.

HARROW.

1,209,565.  Specification of Letters Patent.  Patented Dec. 19, 1916.

Application filed November 26, 1915. Serial No. 63,650.

*To all whom it may concern:*

Be it known that I, KYLE READ DICKINSON, a citizen of the United States, residing at Ballinger, in the county of Runnels and State of Texas, have invented new and useful Improvements in Harrows, of which the following is a specification.

This invention relates to harrows, and it has for its object to produce a device of this class which will be particularly serviceable on ground that is baked hard or caked so as to necessitate replanting of crops.

A further object of the invention is to produce a harrow having pivotally supported tooth members and means for varying the pressure of said tooth members with respect to the soil, thereby regulating the depth to which the soil will be scratched or scarified.

A further object of the invention is to produce a harrow of the class described which by simple adjustment of the parts will change the position of the teeth with respect to the soil so that the teeth may be presented in a vertical or in a somewhat tilted position, as may be preferred.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

Figure 5:
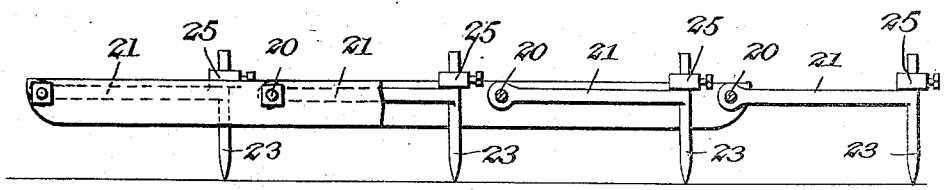
Figure 6:
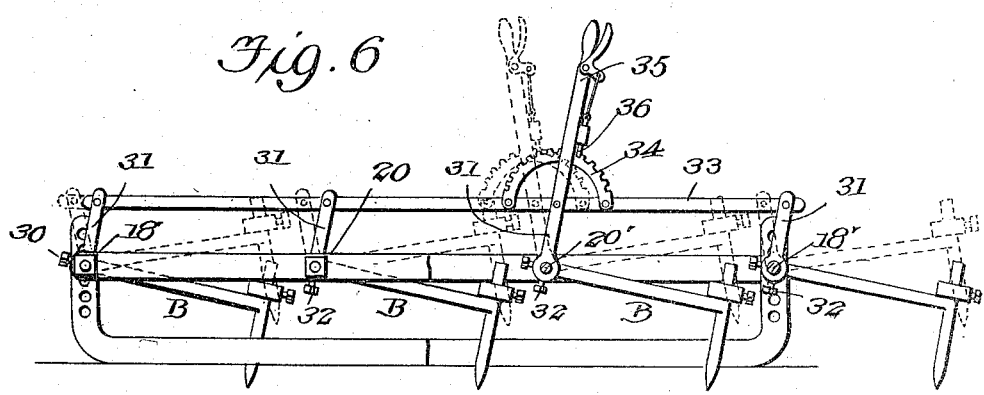
Figure 7:
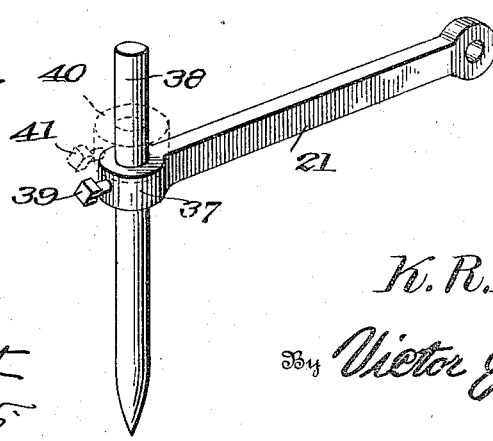

In the drawing,—Figure 1 is a top plan view of a harrow constructed in accordance with the invention. Fig. 2 is a view in side elevation of the same. Fig. 3 is a longitudinal sectional view taken on the line 3—3 in Fig. 1, and showing an adjustment slightly different to that shown in Fig. 2. Fig. 4 is a perspective detail view of one of the teeth. Fig. 5 is a side elevation partly in section showing the harrow with the bottom frame discarded. Fig. 6 is a side elevation partly in section showing the harrow including the bottom frame and equipped with means whereby the teeth may be raised to a non-engaging position with respect to the ground. Fig. 7 is a perspective detail view illustrating a modification in the construction of the harrow teeth.

Corresponding parts in the several figures are denoted by like characters of reference.

A ground frame is provided comprising side members or runners 15 provided at the ends thereof with uprights 16, each of said uprights having a plurality of apertures 17 for the passage of a rod or shaft 18 on which the side members 19 of the top frame are supported, said top frame being vertically adjustable by adjustment of the rods 18 in the respective apertures 17, and the side members 19 of the top frame are connected together at intervals by rods or shafts 20.

The tooth members B used in connection with the harrow frame are each composed of a shank 21 having at one end an eye 22 and at the other end a tooth or scarifier 23, the latter being positioned substantially at right angles to the shank 21. Each tooth 23 includes a downwardly extending ground engaging portion and an upwardly extending portion 24 on which one or more weights 25 may be mounted and secured by means of set screws 26, or in any other convenient manner. The tooth members B, of which any desired number may be used, are mounted by the eyes 22 on the respective shafts 18, 20 in such fashion as to extend rearwardly with respect to the shafts on which they are mounted. The respective tooth members may be fixed against displacement with respect to the shafts 18, 20 by means of set collars 27.

The parts of the device are so constructed and proportioned that in one position of the top frame, the teeth 23 will be substantially at right angles with respect to the surface of the ground. By raising the top frame, the forward ends of the shanks 21 will be lifted, and the upper ends of the teeth will thus be tilted rearwardly, while by lowering the top frame, the forward ends of the shanks 21 will be lowered, and the upper ends of the teeth will be tilted forwardly, and it will thus be possible by simple adjustment of the top frame to present the teeth at various angles with respect to the ground. The teeth may also be equipped with weights suitably proportioned to cause the teeth to engage the ground with the requisite degree of pressure for effective work.

Under the construction illustrated in Fig. 5, the bottom frame, including the runners 15, is entirely dispensed with. In other respects, the construction is unchanged, and the operation also is the same except that the ground engaging teeth 23 may not be tilted or adjusted so as to be presented at various angles with respect to the surface of the ground.

In Fig. 6 a construction is illustrated embodying substantially the construction shown in Figs. 1, 2 and 3, except that the cross bars 18 and 20, here designated by 18' and 20', are in the nature of rock shafts which may rock in their respective bearings. The eyes 22 of the tooth members B are also provided with set screws 30, whereby they may be fixed securely on the respective rock shafts so that when the latter are rocked, the tooth members will be rocked therewith. The several rock shafts 18' and 20' are provided with upwardly extending arms 31 secured by set screws 32, the upper ends of said arms being connected pivotally with a connecting rod 33 having a rack segment 34. One of the arms which is specially designated by 31 is extended upwardly to form a lever 35 having a stop member 36 engaging the rack segment 34. It will be seen that by this construction the several rock shafts 18' and 20' may be simultaneously rocked for the purpose of lifting the tooth members to a non-engaging position with respect to the surface of the ground, as indicated in dotted lines.

In Fig. 7 there has been illustrated a modified construction of the tooth members which consists in providing the arm 21 at its rear end with an eye 37 to receive a vertically adjustable scarifier 38 which may be retained in adjusted position by means of a set screw 39. Under this construction the upwardly extending portion of the scarifier may be provided with a weight 40 secured thereon by a set screw 41. This modification represents a construction which enables the length of the ground engaging portion of the scarifier to be varied according to the nature and condition of the soil engaged thereby.

Having thus described the invention, what is claimed as new, is:—

In a harrow of the character described, a tooth member comprising a shank having an eye at its forward end and provided at its rearward end with a scarifier having a downwardly extending ground engaging portion and an upwardly extending portion, and a weight mounted on the upwardly extending portion of the scarifier.

In testimony whereof I affix my signature in presence of two witnesses.

KYLE R. DICKINSON.

Witnesses:
J. F. LUSK,
R. H. STOCKS.